(12) United States Patent
Goyal et al.

(10) Patent No.: US 12,190,066 B2
(45) Date of Patent: Jan. 7, 2025

(54) INTEGRATED SECONDARY VIRTUAL AGENTS

(71) Applicant: ServiceNow, Inc., Santa Clara, CA (US)

(72) Inventors: Gaurav Goyal, San Jose, CA (US); Shipra Gupta, Sunnyvale, CA (US); Ashita Narayan, Hyderabad (IN); Kakarla V V D L Narayana, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 343 days.

(21) Appl. No.: 17/590,625

(22) Filed: Feb. 1, 2022

(65) Prior Publication Data

US 2023/0244877 A1 Aug. 3, 2023

(51) Int. Cl.
*H04L 51/02* (2022.01)
*G06F 3/0481* (2022.01)
*G06F 3/0484* (2022.01)
*G06F 40/103* (2020.01)
*G06F 40/279* (2020.01)
*G06F 40/35* (2020.01)

(52) U.S. Cl.
CPC ............ *G06F 40/35* (2020.01); *G06F 3/0481* (2013.01); *G06F 3/0484* (2013.01); *G06F 40/103* (2020.01); *G06F 40/279* (2020.01); *H04L 51/02* (2013.01)

(58) Field of Classification Search
CPC ....... H04L 51/02; G06F 40/35; G06F 3/0481; G06F 40/103; G06F 40/279
USPC .............................................. 704/9, 231, 251
See application file for complete search history.

(56) References Cited

U.S. PATENT DOCUMENTS

| | | | |
|---|---|---|---|
| 2016/0099892 A1* | 4/2016 | Palakovich | H04L 51/04 709/206 |
| 2016/0286027 A1* | 9/2016 | Lee | H04M 1/72436 |
| 2022/0394348 A1* | 12/2022 | Hatambeiki | G06V 40/28 |

* cited by examiner

*Primary Examiner* — George C Monikang
(74) *Attorney, Agent, or Firm* — Van Pelt, Yi & James LLP (57) ABSTRACT

A chat message is received from a user to a primary virtual agent service. A secondary virtual agent service to handle the chat message is automatically evaluated and selected. The secondary virtual agent service is selected from a plurality of candidate secondary virtual agent services that includes at least one virtual agent service provided by a third-party entity external to an entity providing the primary virtual agent service. The chat message is transformed from a first format of the primary virtual agent service to a second format of the selected secondary virtual agent service. The chat message is forwarded in the second format to the selected secondary virtual agent service.

20 Claims, 6 Drawing Sheets

INTEGRATED SECONDARY VIRTUAL AGENTS

BACKGROUND OF THE INVENTION

Virtual agents or assistants allow a user to interact with a software service that can implement automated digital workflows as part of a chat conversation. Virtual agents can be used, for example, to help resolve customer problems as well as employee issues. As a few example scenarios, using a virtual agent, a customer can initiate a product return and query the operating hours of a business. Similarly, an employee can submit an expense report and book travel arrangements. Typically, a virtual agent is configured with one or more digital workflows that are conducted as a conversation with the user. A digital workflow can include and address different topics in anticipation of the needs of the user of the virtual agent. When a user interacts with a virtual agent, the user's intent is determined and mapped to one of the topics of a digital workflow. Each topic is configured with a corresponding topic workflow that helps to address the user's issue, for example, by stepping through the problem. As new needs arise, workflows and topics can be added or modified to improve the automated responses of a virtual agent. In many scenarios, multiple different virtual agents exist within a single user environment and serve different purposes

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Integrated secondary virtual agents are disclosed. Using the disclosed techniques, a virtual agent application service that supports a primary virtual agent is enhanced to support additional secondary virtual agents and their diverse functionality. The secondary virtual agents are hosted external to the virtual agent application service and its primary virtual agent. Moreover, the secondary virtual agents can be implemented and hosted by one or more third parties. The virtual agent application service is configured to interface and support the secondary virtual agents, which provides the functionality of the secondary virtual agents to users of the virtual agent application service. All of the supported virtual agents, including the primary virtual agent of the virtual agent application service and the supported secondary virtual agents, can be accessed via the virtual agent application service using a virtual agent application service client. The virtual agent application service performs topic discovery and selects the appropriate virtual agent to service the conversation topic. In the event the selected virtual agent is a secondary virtual agent, the virtual agent application service translates the messages and functionality of the secondary virtual agent into a format compatible with the virtual agent application service and virtual agent application service client. By supporting integrated secondary virtual agents, the virtual agent application service provides a significantly improved and unified virtual agent experience for users. Instead of requiring users to initiate chat conversations with different virtual agent services, each with their own platform and user interface, a user initiates all chat conversation using a single virtual agent application service.

In some embodiments, a chat message from a user to a primary virtual agent service is received. For example, a virtual agent application service implements a virtual agent service that is the primary virtual agent responsible for processing chat conversations. A user initiates a chat conversation by connecting to the virtual agent application service using a virtual agent application service client. A secondary virtual agent service is automatically evaluated and selected to handle the chat message. For example, the chat message is evaluated to determine a conversation topic with a corresponding workflow that is implemented by a secondary virtual agent. The secondary virtual agent implements a secondary virtual agent service and is selected to handle the received chat message and corresponding conversation. In some embodiments, the secondary virtual agent service is selected from a plurality of candidate secondary virtual agent services that includes at least one virtual agent service provided by a third-party entity external to an entity providing the primary virtual agent service. For example, in addition to the primary virtual agent, the virtual agent application service supports and interfaces with multiple secondary virtual agent services including secondary virtual agent services provided and hosted externally by third parties. This allows the virtual agent application service to support multiple virtual agents including non-native virtual agents running on different platforms and hosted by third parties. The chat message from a first format of the primary virtual agent service is translated to a second format of the selected secondary virtual agent service. For example, the virtual agent application service translates the chat message to support the format of the selected secondary virtual agent. The chat message in the second format is forwarded to the selected secondary virtual agent service. For example, once translated, the translated message is forwarded by the virtual agent application service to the selected secondary virtual agent service implemented by the secondary virtual agent.

Figure 1:
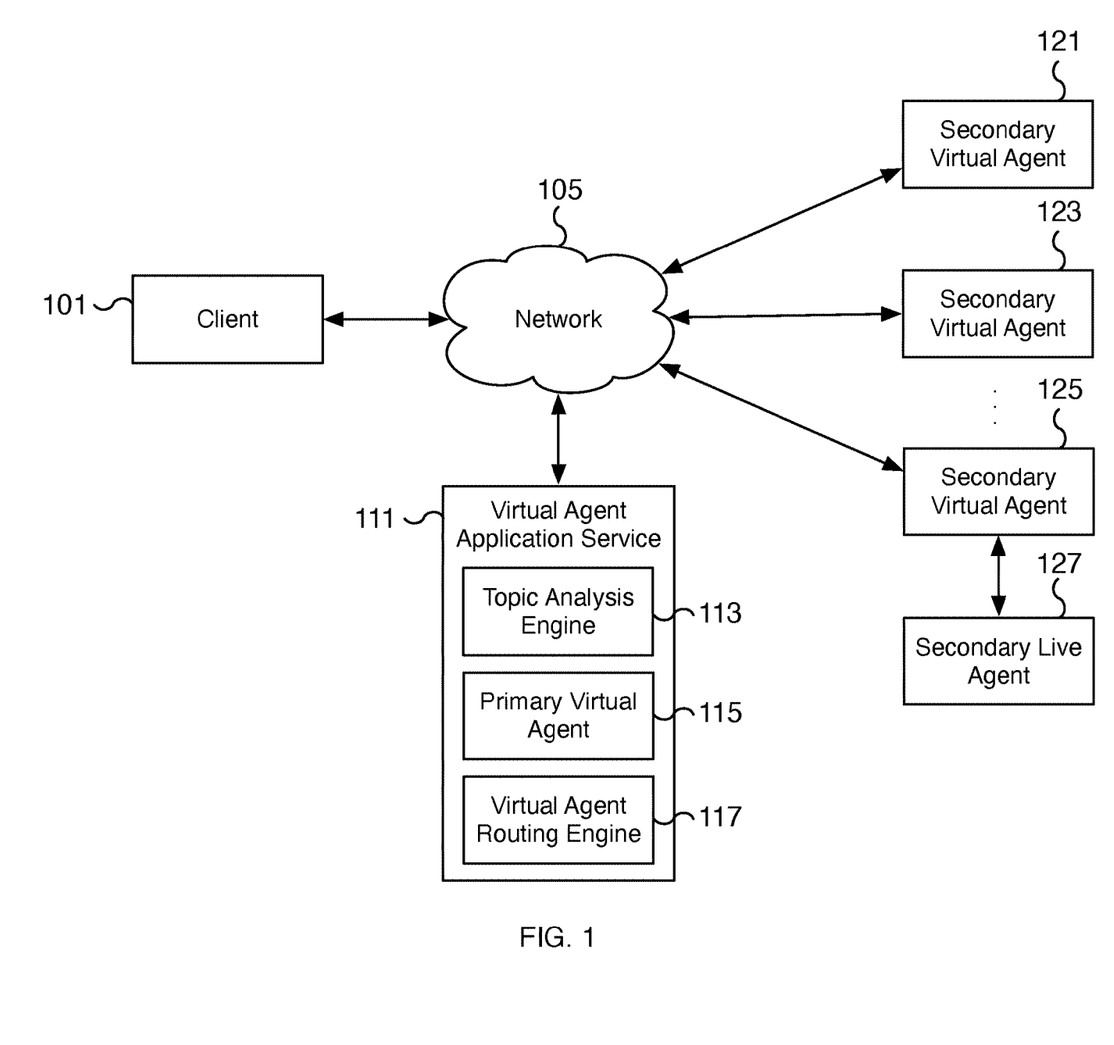
FIG. 1 is a block diagram illustrating an example of a network environment of a virtual agent application service for performing automated chat conversations.

FIG. 1 is a block diagram illustrating an example of a network environment of a virtual agent application service for performing automated chat conversations. In the example shown, the client is an example virtual agent client for accessing virtual agent services provided by virtual agent application service 111 via network 105. Client 101 can be a chat, messaging, voice, or other form of a virtual agent client. For example, client 101 is a network client such as a mobile device, a desktop computer, a laptop, a kiosk, a voice assistant, a wearable device, a tablet, or another computing device with a virtual agent client interface for accessing virtual agent services. A user utilizes client 101 to send messages to and receive messages from one or more virtual agents configured for virtual agent application service 111. The messages can be rich messages that include interactive user interface elements such as a calendar user interface element for selecting dates, a document viewer for reviewing documents, or a media player for watching video, viewing photos, and/or listening to audio. Virtual agent application service 111 includes topic analysis engine 113, primary virtual agent 115, and virtual agent routing engine 117. The virtual agent services offered by and interfaced with virtual agent application service 111 include virtual agent services performed by primary virtual agent 115 as well as secondary virtual agents such as secondary virtual agents 121, 123, and 125. Each virtual agent can also utilize one or more live agents. For example, secondary virtual agent 121 can transfer a conversation over to and receive a transferred conversation from secondary live agent 127. Although only three secondary virtual agents and a single secondary live agent are shown in FIG. 1, additional secondary virtual agents and live agents can exist in the network environment of FIG. 1 and be interfaced with virtual agent application service 111. As shown in FIG. 1, client 101, virtual agent application service 111, and secondary virtual agents 121, 123, and 125 are communicatively connected via network 105. Network 105 can be a public or private network. In some embodiments, network 105 is a public network such as the Internet.

In some embodiments, virtual agent application service 111 supports multiple virtual agents including primary virtual agent 115 and secondary virtual agents 121, 123, and 125. Primary virtual agent 115 can be hosted by virtual agent application service 111 while secondary virtual agents 121, 123, and 125 are hosted by one or more external services including by third parties. In various embodiments, virtual agent application service 111 includes topic analysis engine 113 for topic discovery to match a user's initial chat message to a topic. For example, topic analysis engine 113 matches an utterance extracted from the user's initial chat message to a configured conversation topic. In some embodiments, topic analysis engine 113 includes a Natural Language Understanding (NLU) engine (not shown) to determine an intent from the utterance. Topic analysis engine 113 then matches the determined intent to one of the configured topics. In some embodiments, topic analysis engine 113 also includes a keyword analysis engine (not shown) to determine a matching topic from the utterance using configured topic keywords. In various embodiments, topic analysis engine 113 determines a confidence score for the initial chat message, whether determined using an NLU engine, keyword analysis engine, and/or another topic discovery engine, and based on the determined confidence score identifies a matching configured topic. The topic is then mapped to a virtual agent such as one of primary virtual agent 115 and secondary virtual agents 121, 123, and 125. In the event the topic maps to primary virtual agent 115, primary virtual agent 115 is tasked with processing the chat conversation. In the event the topic maps to a secondary virtual agent, virtual agent routing engine 117 routes the conversation to the appropriate secondary virtual agent such as one of secondary virtual agents 121, 123, and 125.

In various embodiments, an operator configures the virtual agents supported by virtual agent application service 111 by interfacing with a management interface of virtual agent application service 111. For example, an operator can configure a mapping of utterances to topics to primary and secondary virtual agents including by providing associated utterances and/or keywords for configured topics. In some embodiments, topic analysis engine 113 is trained using utterances provided by the operator to match intents and topics to primary virtual agent 115 and secondary virtual agents 121, 123, and 125. For secondary virtual agents, such as secondary virtual agents 121, 123, and 125, an operator additionally configures the message format used by the secondary virtual agents. Virtual agent routing engine 117 uses the configured message formats to perform message translation between the message formats used by primary virtual agent 115 and each of secondary virtual agents 121, 123, and 125. As part of the routing performed by virtual agent routing engine 117, virtual agent routing engine 117 can translate rich messages that include additional functionality other than text such as interactive user interface elements.

In the example of FIG. 1, secondary virtual agents 121, 123, and 125 and secondary live agent 127 are example secondary virtual agent and live agent services. Each can implement different workflow processes. For example, one agent service can be used to process Human Resources requests, another for corporate travel requests, and a third for initiating and following up on Information Technology (IT) incidents. Additional agent services can be used for team communications, corporate messaging, and accessing corporate knowledge articles, among other purposes. Each virtual agent can utilize a different messaging format and platform. As shown with secondary live agent 127, each virtual agent can also be integrated with a live agent (e.g., secondary virtual agent 125 with secondary live agent 127). Based on the progress of the conversation, the conversation can be transferred from/to a virtual agent to/from a live agent.

In some scenarios, a user via client 101 directly connects to secondary virtual agents such as secondary virtual agents 121, 123, and 125. However, the existence of multiple virtual agents that address different domains increases the complexity of the user experience. Using virtual agent application service 111, a client interfaces directly with only a single virtual agent service. For each topic, virtual agent application service 111 manages the conversation using one of the configured virtual agents. When a topic completes, virtual agent application service 111 can determine whether the user has an additional topic to address and assign the appropriate virtual agent to address the topic if appropriate. Virtual agent application service 111 allows a user to seamlessly switch between different virtual agents including secondary virtual agents and live agents from within the same virtual agent user interface. Despite interfacing with workflows implemented by different virtual agents and potentially different virtual agent platforms, virtual agent application service 111 presents the user with a consistent user interface experience including by translating the messages created for and by the secondary virtual agents and live agents into the format utilized by the primary virtual agent.

In the example shown, portions of the communication path between the components are shown. Other communication paths may exist, and the example of FIG. 1 has been simplified to illustrate the example clearly. Although single instances of some components have been shown to simplify the diagram, additional instances of any of the components shown in FIG. 1 may exist. For example, virtual agent application service 111 may include one or more virtual agent application servers. In some embodiments, the virtual agent application server(s) for implementing topic analysis engine 113, primary virtual agent 115, and virtual agent routing engine 117 are a combination of different servers of virtual agent application service 111. Additionally, virtual agent application service 111 can include components not shown but described herein such as a live agent for processing a chat conversation, a management interface for configuring virtual agents, and a Natural Language Understanding (NLU) training engine for training utterances to predict matching intents. Furthermore, client 101 is just one example of a potential client to virtual agent application service 111. Similarly, secondary virtual agents 121, 123, and 125 and secondary live agent 127 implement example secondary virtual agent and live agent services, and more or fewer secondary services can exist. In some embodiments, components not shown in FIG. 1 may also exist.

Figure 2:
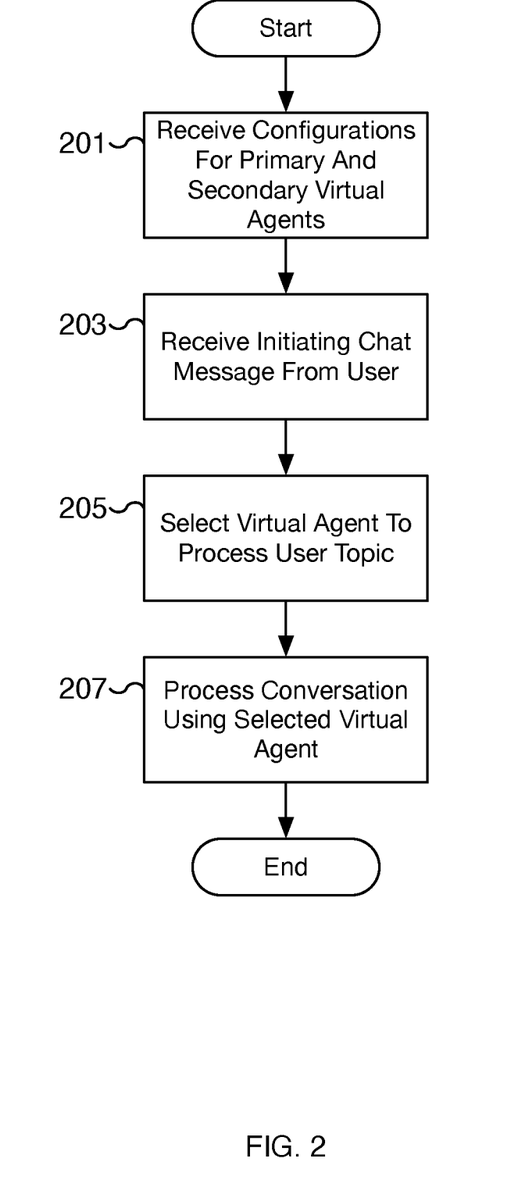
FIG. 2 is a flow chart illustrating an embodiment of a process for processing user conversations using a virtual agent application service.

FIG. 2 is a flow chart illustrating an embodiment of a process for processing user conversations using a virtual agent application service. For example, a user initiates a chat conversation through a virtual agent application service to address one or more topics. At the start of each topic, the topic conversation is determined based on one or more initial messages received from the user. The virtual agent application service then matches the determined topic to the appropriate virtual agent. The appropriate virtual agent for addressing the conversation topic can be a primary virtual agent implemented as part of the virtual agent application service or one of multiple secondary virtual agents implemented external to the virtual agent application service. In various embodiments, the process of FIG. 2 is performed by virtual agent application service 111 of FIG. 1. In some embodiments, the configuration of virtual agents and each chat conversation is initiated by an operator or user of a client such as client 101 of FIG. 1. In some embodiments, each user conversation topic that is processed as part of the process of FIG. 2 utilizes a virtual agent or live agent service such as one of primary virtual agent 115 of FIG. 1, secondary virtual agents 121, 123, and 125 of FIG. 1, and secondary live agent 127 of FIG. 1.

At 201, configurations for primary and secondary virtual agents are received. For example, an operator configures a primary virtual agent of the virtual agent application service. Similarly, an operator configures one or more secondary virtual agents to be supported by the virtual agent application service. In configuring a virtual agent, the operator can associate utterances with intents using a Natural Language Understanding (NLU) engine. Once configured, the NLU engine can determine an intent based on a user utterance and match the intent to one of the configured topics based on a confidence score. Similarly, an operator can configure topics using keywords instead of NLU. Once configured, a keyword analysis engine can determine a matching topic based on a user utterance by analyzing the user utterance for keywords and determining a confidence score. The operator can also configure a live agent to use with the primary virtual agent. Based on a workflow for a topic, a live agent may be required to intervene.

In various embodiments, the configuration received for secondary virtual agents is similar to the configuration received for the primary virtual agent. Unlike the primary virtual agent, however, an operator can configure different granularities of topics for each secondary virtual agent. For example, at a coarse level, an operator can configure a single topic for each secondary virtual agent. For each configured topic, the configuration can specify using keywords to be used with a keyword analysis engine or utterances to be used with a Natural Language Understanding (NLU) engine for topic discovery. When the configuration is performed at a coarse level, a matching secondary virtual agent may perform additional topic (or sub-topic) matching at the secondary virtual agent, including intent and topic discovery. For example, a secondary agent is selected based on the keywords "Human Resources." At the Human Resources secondary virtual agent, additional topic discovery is performed to identify a narrower topic for the user conversation. In various embodiments, configuring a secondary virtual agent using a coarse topic is particularly applicable in the event the secondary virtual agent is already trained using NLU to understand utterances. The operator can easily configure the virtual agent application service to utilize the trained secondary virtual agent using a coarse topic with little or minimal additional training and configuration.

In the event a secondary virtual agent is not trained, for example, with user utterances to identify a matching intent, an operator can perform the training and configuration at the virtual agent application service. This allows the training and configuration to be shifted from the secondary virtual agent to the virtual agent application service. For example, a secondary virtual agent configured with multiple topics at the virtual agent application service can implement multiple topic workflows while still relying on the virtual agent application service to identify the correct topic.

At 203, an initiating chat message is received from the user. For example, a user sends via a virtual agent client a message received at the virtual agent application service. In various embodiments, the message is sent by a human user via a user chat interface of the client. Although the user's request may be ultimately handled by a secondary virtual agent, the initial chat message is directed to and received at the virtual agent application service and initiates a process to determine the proper virtual agent to handle the conversation topic. From the perspective of the user, the user is interacting with a primary virtual agent of the virtual agent application service and not a secondary virtual agent. In some embodiments, the initial messages initiating the chat conversation are received by the primary virtual agent of the virtual agent application service.

At 205, a virtual agent is selected to process the user topic. Using the initiating chat message received at 203, a topic is identified based on a determined confidence score. The confidence score may be determined using a variety of topic discovery techniques including a Natural Language Understanding (NLU) analysis or a keyword analysis. Once a configured topic is identified as a matching topic, the associated virtual agent is selected. In various embodiments, each configured topic is mapped to a specific virtual agent, which includes either the primary virtual agent or one of the configured secondary virtual agents.

At 207, the conversation is processed using the selected virtual agent. For example, using the virtual agent selected at 205, the conversation is processed until the user's topic is resolved. The topic can be processed either locally at the virtual agent application service by the primary virtual agent or via a remote secondary virtual agent. In the event a secondary virtual agent is selected at 205, the virtual agent application service routes messages between the user client and the selected secondary virtual agent. In various embodiments, the virtual agent application service performs message translation between the primary virtual agent format and the format of the secondary virtual agent. In some embodiments, the virtual agent application service also translates user interface controls implemented by the secondary virtual agent into corresponding user interface controls implemented by the primary virtual agent and user virtual agent client. For example, translated user interface controls that implement rich message features can include a calendaring user interface element for selecting a date or range of dates, a file upload user interface element for uploading documents, a media player user interface element for viewing media, and an image capture user interface element for taking photos, among others.

In some embodiments, once a user's specific conversation topic is resolved, the process of FIG. 2 can be repeated to address another topic from the same user. For example, a user can request multiple topics to be resolved during the same session with the virtual agent application service. A first topic may relate to onboarding a new hire and is processed by a human resources virtual agent and a second topic may be related to a broken laptop and is processed by an information technology virtual agent. Using the process of FIG. 2, a new topic can be initiated by looping back to step 203. For example, in the event an additional initiating chat message is received after the previous topic has been closed, processing can loop back to 203 to handle the user's new conversation topic.

Figure 3:
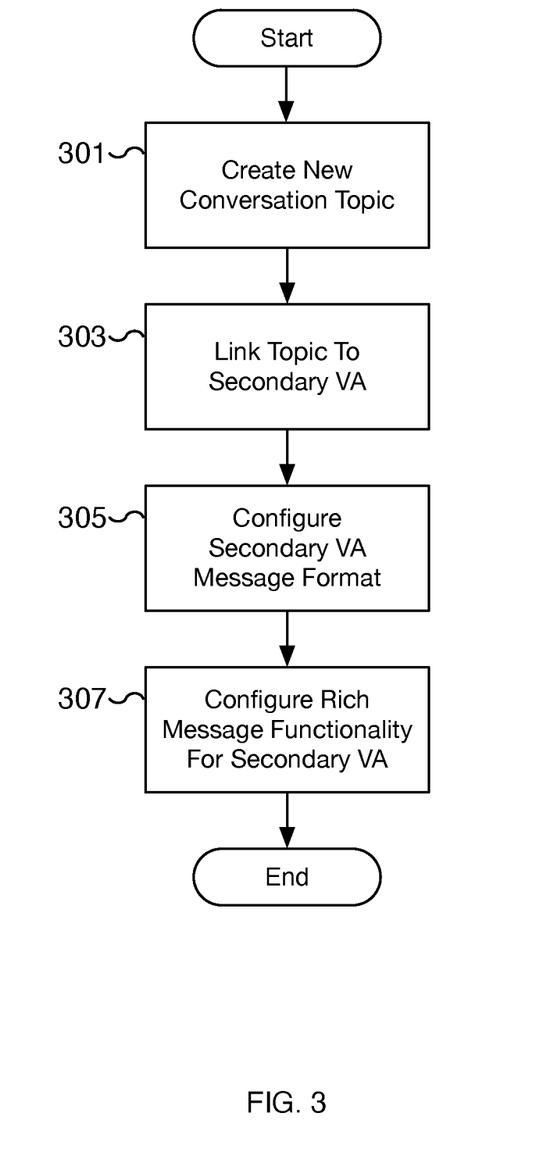
FIG. 3 is a flow chart illustrating an embodiment of a process for configuring a virtual agent application service to process a conversation topic using a secondary virtual agent.

FIG. 3 is a flow chart illustrating an embodiment of a process for configuring a virtual agent application service to process a conversation topic using a secondary virtual agent. For example, an operator configures the virtual agent application service to process a workflow topic using a secondary virtual agent. This allows users to access the functionality of the secondary virtual agent via the virtual agent application service. In various embodiments, the process of FIG. 3 can be repeated to configure additional topics and additional secondary virtual agents. In some embodiments, the process of FIG. 3 is performed at 201 of FIG. 2. In various embodiments, the process of FIG. 3 is performed by virtual agent application service 111 of FIG. 1 by an operator via a remove client such as client 101 of FIG. 1. In some embodiments, the secondary virtual agent configured using the process of FIG. 3 is secondary virtual agents 121, 123, and/or 125 of FIG. 1.

At 301, a new conversation topic is created. For example, a new conversation topic is created at the virtual agent application service using a management interface provided by the virtual agent application service. The creation of the new topic includes configuring topic properties and topic discovery for the topic. For example, configured topic properties can include a name, category, description, and live agent properties. In some embodiments, the topic discovery configuration includes assigning associated keywords and/or utterances for the topic that are used to determine a confidence score. For example, using assigned keywords, a keyword analysis engine can analyze a user message for the assigned keywords to determine a confidence score measuring how strongly the message matches to the configured topic. In some embodiments, the topic discovery configuration includes assigning utterances to the topic to determine an intent. For example, sample phrases or utterances are used to train a Natural Language Understanding (NLU) engine to determine a user's intent based on a provided utterance. The intent is then matched to the configured topic by determining a confidence score.

In some embodiments, the topic configured is a coarse topic that allows a secondary agent to be matched to the configured topic but requires additional topic discovery to be performed by the secondary agent. The configured coarse topic is sufficient to differentiate a user message between different virtual agents but requires a selected secondary virtual agent to perform additional topic discovery before a specific workflow can be selected. The configured coarse topic requires minimal configuration at the virtual agent application service and allows a previously trained secondary virtual agent to be easily integrated into and supported by the virtual agent application service. Once integrated, users can utilize the functionality of the previously trained secondary virtual agent within a universal user interface client of the virtual agent application service. In other scenarios, such as for a secondary virtual agent that was not previously trained, multiple detailed topics can be configured at the virtual agent application service. Detailed topic discovery is performed at the virtual agent application service and the determined intent and matching topic can be passed as a parameter to the selected secondary virtual agent. This allows the secondary virtual agent to avoid performing topic discovery including performing Natural Language Understanding (NLU) training as well as determining a matching intent/topic.

At 303, the conversation topic is linked to a secondary virtual agent. For example, the topic created at 301 is linked to a specific secondary virtual agent hosted by a different virtual agent platform and/or by a third party. In some embodiments, the linking to the secondary virtual agent is performed by utilizing the external application programming interface (API) or another programming interface provided by the secondary virtual agent. For example, an API call to invoke the secondary virtual agent for the conversation topic is configured. In some embodiments, the linking further includes setting input and output specifications. For example, an input specification can include parameters to include (and which may be required) when invoking the secondary virtual agent. Input parameters can include a determined topic, a determined intent, a user utterance, and/or additional action parameters for initiating and/or processing a conversation workflow. Output parameters can be configured as well and can include return parameters expected from the secondary virtual agent.

At 305, the secondary virtual agent message format is configured. For example, the secondary virtual agent can utilize a different message format than the primary virtual agent. At 305, the message format of the secondary virtual agent is provided to the virtual agent application service. This configuration allows the virtual agent application service to implement a translation layer to translate messages between the two formats. In some embodiments, one or both virtual agents use a JavaScript Object Notation (JSON) message format.

In some embodiments, only the message format of the secondary virtual agent is provided. For example, an operator specifies the message format of the secondary virtual agent using a JavaScript Object Notation (JSON) message format. Once the secondary virtual agent message format is provided, the management interface presents the operator with a user interface to assist in mapping the provided fields of the secondary virtual agent to fields of the primary virtual agent message format. In this manner, the operator is only required to be familiar with the message format of the secondary virtual agent.

At 307, rich message functionality is configured for the secondary virtual agent. For example, rich message features can be implemented by the secondary virtual agent. These features can include complex and interactive user interface elements that extend functionality beyond a simple text message. At 307, rich message functionality implemented by the secondary virtual agent is translated to the corresponding rich message functionality implemented by the primary virtual agent and compatible with the virtual agent client of the virtual agent application service. For example, when helping a user book a travel reservation, a virtual agent can invoke during the chat conversation a calendaring user interface element to allow the user to select a date or range of dates. As another example, when helping a user submit a reimbursement request, a virtual agent can invoke during the chat conversation a file upload user interface element to allow the user to upload a document such as a receipt. The configuration at 307 allows the rich message feature of the secondary virtual agent to be implemented at the user's client and for the response provided by the user to be translated to a format compatible with and expected by the secondary virtual agent.

Figure 4:
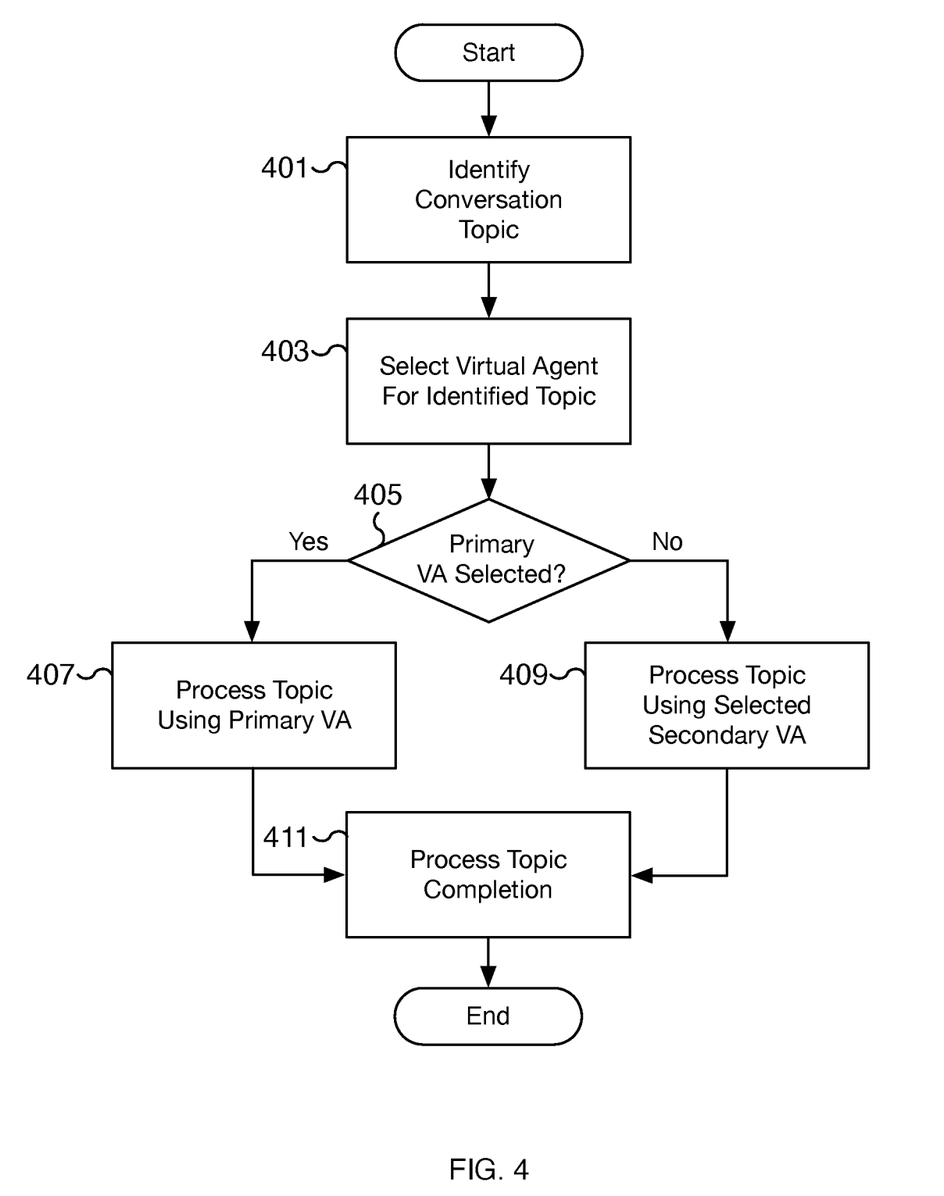
FIG. 4 is a flow chart illustrating an embodiment of a process for servicing a conversation topic using a virtual agent application service configured with multiple virtual agents.

FIG. 4 is a flow chart illustrating an embodiment of a process for servicing a conversation topic using a virtual agent application service configured with multiple virtual agents. For example, using the process of FIG. 4, a topic associated with a user's chat message is determined and the appropriate virtual agent is selected and used to service the user's conversation topic. The virtual agent selected for performing the chat conversation may be a primary virtual agent of the virtual agent application service or a secondary virtual agent supported by the virtual agent application service. In some embodiments, once the process of FIG. 4 completes and the topic is closed, the process of FIG. 4 can be repeated to process additional topics raised by the user. In some embodiments, the process of FIG. 4 is performed at 203, 205, and/or 207 of FIG. 2. In some embodiments, the process of FIG. 4 is performed by virtual agent application service 111 of FIG. 1 in response to a user initiating a chat conversion. In some embodiments, the user initiates and carries on the chat conversation using a virtual agent client interface of client 101 of FIG. 1. In some embodiments, the primary virtual agent is primary virtual agent 115 of FIG. 1 and the secondary virtual agent is one of secondary virtual agents 121, 123, or 125 of FIG. 1.

At 401, a conversation topic is identified. For example, using the initial messages sent by the user, a conversation topic is identified based on a determined confidence score. In some embodiments, the conversation topic is identified by performing topic discovery using a topic analysis engine such as topic analysis engine 113 of FIG. 1. In some embodiments, the topic discovery is performed using the process of FIG. 5. In various embodiments, the identified conversation topic is a topic to be processed locally by the primary virtual agent of the virtual agent application service or by a configured secondary virtual agent.

At 403, a virtual agent is selected for the identified conversation topic. For example, in various embodiments, the virtual agent application service is configured with a 1:1 mapping of configured topics to virtual agents. The virtual agent associated with the identified conversation topic is selected to process the conversation topic. The selected virtual agent can be the primary virtual agent or one of the secondary virtual agents.

At 405, a determination is made whether the primary virtual agent is selected. In the event the primary virtual agent is selected at 403, processing proceeds to 407 where the selected primary virtual agent is used to process the conversation topic. In the event the primary virtual agent is not selected at 403 (and a secondary virtual agent is selected instead), processing proceeds to 409 where the selected secondary virtual agent is used to process the conversation topic.

At 407, the topic is processed using the primary virtual agent. For example, at 403, the primary virtual agent of the virtual agent application service is determined to match the identified topic and is assigned to process the conversation topic. In various embodiments, the primary virtual agent processes the user's conversation topic until it reaches a completion step. In some embodiments, the completion step performed at 411 is initiated by the user, by the primary virtual agent, by a timeout, or by another appropriate trigger. In various embodiments, the processing performed by the primary virtual agent can include transferring the conversation to a live agent. In the event the conversation is transferred to the live agent, the conversation will eventually reach the completion stage or be transferred back to the primary virtual agent.

At 409, the topic is processed using the selected secondary virtual agent. For example, at 403, the selected secondary virtual agent is determined to match the identified topic and is assigned to process the conversation topic. In some embodiments, the configuration of the secondary virtual agent includes configuring input and output specifications for invoking the secondary virtual agent. If configured, the input parameters are populated according to the specified configuration and are used to invoke the secondary virtual agent to process the chat conversation. In some embodiments, the invocation includes input parameters for the initial message(s) or utterances of the chat user and a determined topic and/or intent.

In various embodiments, as part of using the secondary virtual agent to process the conversation topic, the messages of the conversation sent from the user are passed by the virtual agent application service to the secondary virtual agent. Similarly, the responses from the secondary virtual agent are passed by the virtual agent application service to the user. The virtual agent application service performs the necessary message translation functionality to allow the sent messages to be compatible with their end recipient. In various embodiments, the translation performed includes converting rich message features used by the secondary virtual agent to an implementation compatible with the virtual agent application service and virtual agent application service client used by the user. The processing of the topic continues until the conversion reaches a completion step. In some embodiments, the completion step performed at 411 is initiated by the user, by the secondary virtual agent, by a timeout, by the virtual agent application service, or by another appropriate trigger.

In some embodiments, the processing of the topic by the secondary virtual agent can include transferring the conversation to an associated live agent. For example, secondary virtual agent 125 of FIG. 1 can transfer a conversation to secondary live agent 127 of FIG. 1. In the event the live agent is transferred the conversation, the conversation will eventually reach a completion stage or be transferred back to the secondary virtual agent. In some embodiments, the transfer is performed using a virtual agent application service to perform the transfer. In some embodiments, the secondary virtual agent performs the transfer to a live agent without utilizing a virtual agent application service to initiate the transfer. For example, from the perspective of the virtual agent application service, the secondary virtual agent continues to process the conversation topic despite the messages being routed to a live agent.

In some embodiments, although the topic content of the chat conversation is handled by the secondary virtual agent, the actual chat conversation is tunneled through the primary virtual agent. For example, the user interacts using a virtual agent client with the primary virtual agent and each message sent by the user is received by the primary virtual agent and a translated message is forwarded to the secondary virtual agent. Similarly, each response message sent by the secondary virtual agent is received by the primary virtual agent and a translated response message is forwarded to the user.

In some embodiments, the primary virtual agent handles the initial messages used for topic discovery at 401. Once topic discovery has been performed and a virtual agent is selected for the identified topic, the conversation is transferred to the selected secondary virtual agent.

At 411, the completion of the topic is processed. For example, a completion step for closing a conversation topic is performed. In some embodiments, the completion step includes querying the user for feedback about the conversation. The provided feedback can be used to improve the chat conversation and can include feedback for improving the provided virtual agent service and the implemented virtual agent application service solution. In some embodiments, the completion step can include determining whether the user has additional issues to resolve. For example, the user may have an additional topic to address. In the event the user wishes to continue the virtual agent session, the process of FIG. 4 can be repeated, and processing can loop back to step 401 where a new conversation topic is determined and subsequently matched to a virtual agent for processing. In the event the user does not wish to continue with a new topic, the virtual agent session can be closed as part of the completion step.

Figure 5:
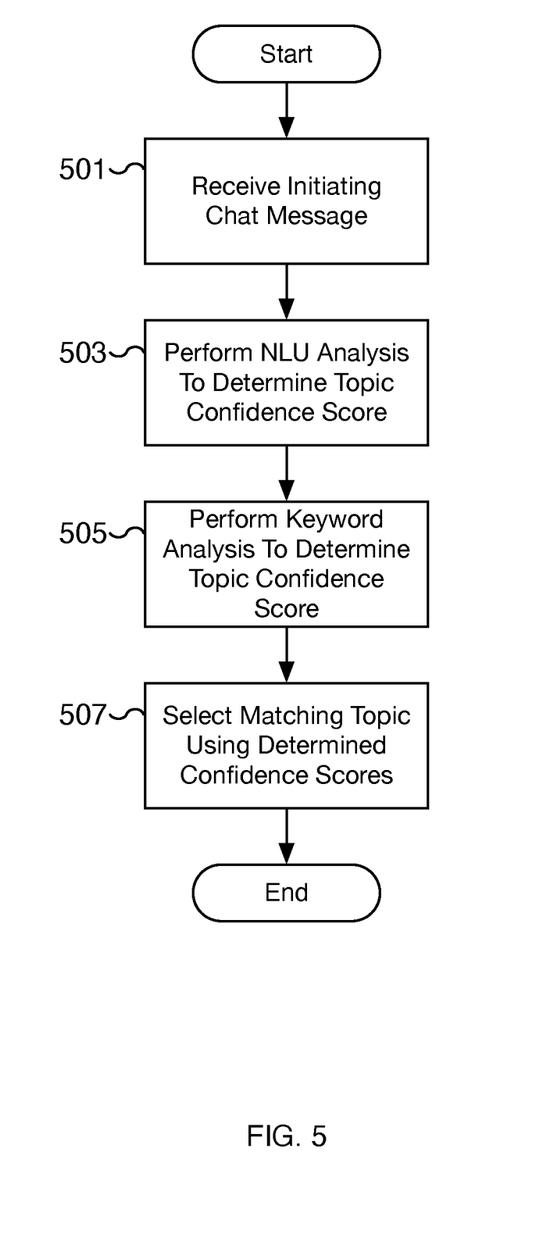
FIG. 5 is a flow chart illustrating an embodiment of a process for performing topic discovery using a virtual agent application service configured with multiple virtual agents.

FIG. 5 is a flow chart illustrating an embodiment of a process for performing topic discovery using a virtual agent application service configured with multiple virtual agents. For example, using the process of FIG. 5, a topic is identified from a user's chat messages initiating a chat conversation. In various embodiments, the process of FIG. 5 is performed by a topic analysis engine such as topic analysis engine 113 of virtual agent application service 111 of FIG. 1. In some embodiments, the topic analysis engine utilizes a Natural Language Understanding (NLU) engine and a keyword analysis engine depending on the configuration of conversation topics. For example, step 503 is performed using an NLU engine and step 505 is performed using a keyword analysis engine. In some embodiments, the process of FIG. 5 is performed at 203 and/or 205 of FIG. 2 and/or at 401 of FIG. 4.

At 501, an initiating chat message is received. For example, a chat message from a user sent using a virtual agent application service client to the virtual agent application service is received and used to initiate a conversation topic. In some embodiments, the initiating chat message is received by the primary virtual agent of the virtual agent application service. The primary virtual agent functions as the receiving virtual agent for the user until the topic of the conversation can be identified and the appropriate virtual agent can be selected. In some embodiments, the initiating chat message is received by a stub virtual agent of the virtual agent application service that functions only to receive initial chat messages before a virtual agent is selected for the identified topic. In this scenario, the stub virtual agent functions similar to the primary virtual agent and from the perspective of the user, the stub virtual agent appears as the primary virtual agent. For example, the user is presented with the look and feel of interacting with the primary virtual agent.

At 503, Natural Language Understanding (NLU) analysis is performed to determine a topic confidence score. For example, for each configured topic with NLU analysis enabled, the initiating chat message received at 501 is analyzed using NLU analysis to determine a corresponding confidence score. In some embodiments, the chat message is analyzed to extract an utterance and the utterance is evaluated using NLU analysis to determine an intent. The intent is then matched to each configured topic using a confidence score. In some embodiments, the confidence score is predicted using a trained machine learning model. In various embodiments, the greater the determined confidence score is for a configured topic, the closer the intent (and the initiating chat message received at 501) matches the configured topic. In some embodiments, NLU analysis can be enabled at a virtual agent level of granularity and/or at a topic level of granularity. For example, if a virtual agent or topic does not implement NLU topic discovery, NLU analysis is not performed to match the initiating chat message to the corresponding virtual agent or topic.

At 505, keyword analysis is performed to determine a topic confidence score. For example, for each configured topic with keyword analysis enabled, the initiating chat message received at 501 is analyzed using keyword analysis to determine a corresponding confidence score. In some embodiments, the chat message is analyzed to extract the text of the message, which is then analyzed using keyword analysis. In various embodiments, a confidence score is predicted based on the keyword analysis. For example, a message that includes all the configured keywords of a topic has a high confidence score whereas a message that includes none of the configured keywords of a topic has an extremely low (and possibly zero) confidence score. In various embodiments, the greater the determined confidence score is for a configured topic, the closer the initiating chat message received at 501 matches the configured topic. In some embodiments, keyword analysis can be enabled at a virtual agent level of granularity and/or at a topic level of granularity. For example, if a virtual agent or topic does not implement keyword topic discovery, keyword analysis is not performed to match the initiating chat message to the corresponding virtual agent or topic.

At 507, a matching topic is selected using determined confidence scores. For example, using the confidence scores determined for each configured topic at 503 and/or 505, the initiating chat message received at 501 is matched to one of the topics. In various embodiments, the identified topic is the configured topic with the highest confidence score. In some embodiments, the Natural Language Understanding (NLU) analysis and keyword analysis scores are normalized so that they can be compared to one another. For example, some topics may only implement keyword analysis and others may only implement NLU analysis. The normalization allows the corresponding confidence scores to be compared between differently configured topics. In various embodiments, only a single matching topic is selected. For example, in the event two configured topics have the exact same confidence score, the selected topic can be based on a configured priority list. As one example, topics configured for the primary virtual agent can take precedence over topics configured for the secondary virtual agents. Similarly, the different configured secondary virtual agents can be ordered by priority with respect to each other.

Figure 6:
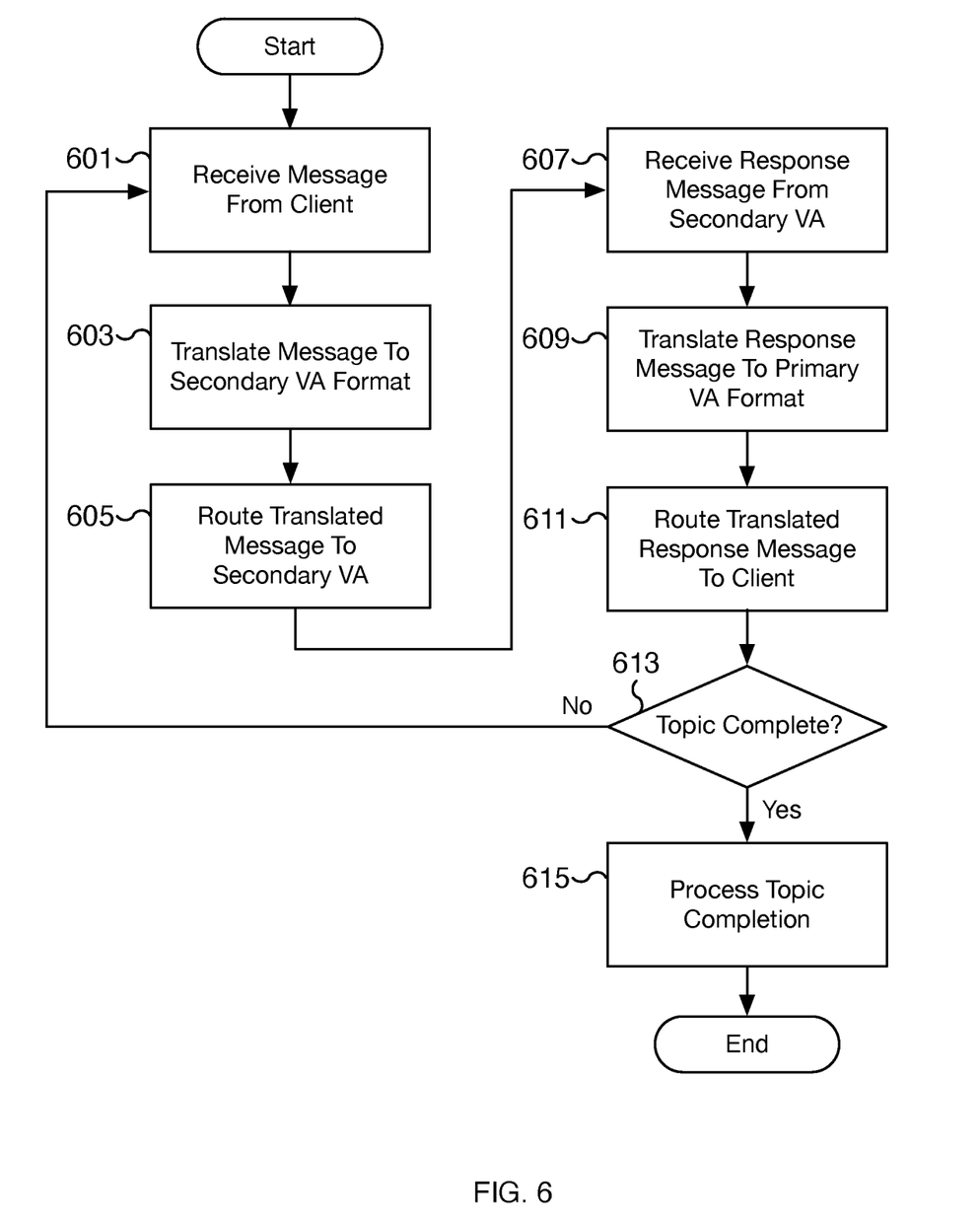
FIG. 6 is a flow chart illustrating an embodiment of a process for servicing a conversation topic using a secondary virtual agent.

FIG. 6 is a flow chart illustrating an embodiment of a process for servicing a conversation topic using a secondary virtual agent. For example, using the process of FIG. 6, a virtual agent application service configured with secondary virtual agents can provide a chat user access to the functionality of the secondary virtual agents. From the perspective of the user, the chat conversation is with the virtual agent application service and uses a virtual agent application service client. To support the functionality of the secondary virtual agent, messages passed from the user to the virtual agent application service are translated and forwarded to the secondary virtual agent. Similarly, the responses from the secondary virtual agent are translated by the virtual agent application service and forwarded to the user client. In some embodiments, the process of FIG. 6 is performed at 207 of FIG. 2 and/or at 409 and/or 411 of FIG. 4. In some embodiments, the process of FIG. 6 is performed by virtual agent application service 111 of FIG. 1 and the secondary virtual agent is one of secondary virtual agents 121, 123, or 125 of FIG. 1. In some embodiments, the message routing and translation of the process of FIG. 6 is performed by virtual agent routing engine 117 of virtual agent application service 111 of FIG. 1.

At 601, a message is received from the client. For example, a text chat message or a rich chat message is received from the virtual agent application service client. A text chat message can include simply text whereas a rich chat message can include a complex message involving complex data types, responses, and response formats such as a span of calendar dates, a document, an image, or video, as examples. In various embodiments, the message is received at the virtual agent application service. In some embodiments, the message is received by the primary virtual agent of the virtual agent application service or by a stub virtual agent of the virtual agent application service. The receiving primary (or stub) virtual agent functions as an intermediary node for the chat conversation between the virtual agent application service client and the secondary virtual agent.

At 603, the message is translated to the secondary virtual agent format. For example, the message received at 601 is received in a format compatible with the primary virtual agent. At 603, the message is translated into the format used by the secondary virtual agent. In some embodiments, the translation relies on the configuration performed at steps 305 and/or 307 of FIG. 3. For example, the message payload of the primary virtual agent format is converted to the payload format of the secondary virtual agent format. In some embodiments, in addition to a payload conversation, the contents of the message may be converted, for example, from data types compatible with the primary virtual agent to corresponding data types compatible with the secondary virtual agent. For example, the primary virtual agent and secondary virtual agent may utilize different date format types and a conversation is performed to convert an argument having a date format of the primary virtual agent to a date format of the secondary virtual agent.

At 605, the translated message is routed to the secondary virtual agent. For example, the message translated at 605 is forwarded by and from the virtual agent application service to the selected secondary virtual agent. In various embodiments, the secondary virtual agent is hosted external from the virtual agent application service and can be hosted by a third party. In some embodiments, the routing is performed at least in part by initiating a remote procedure or function call from the virtual agent application service to the secondary virtual agent. The remote call can access an application programming interface (API) of the secondary virtual agent. In some embodiments, the secondary virtual agent is accessed via a web-related API such as a Representational state transfer (REST) based or RESTful API. In some embodiments, the message is routed to the secondary virtual agent using the primary virtual agent of the virtual agent application service. In some embodiments, as part of the process of routing the message to the secondary virtual agent, the translated message is packaged with input parameters configured to be included by the virtual agent application service. Example parameters may include arguments such as an utterance provided by the user, an intent determined by the virtual agent application service, and/or the conversation topic determined by the virtual agent application service, among others. The prepared input parameters may be input arguments to an API invocation.

At 607, a response message is received from the secondary virtual agent. For example, once the message is routed to the secondary virtual agent at 605, the translated message is processed by the secondary virtual agent and a response message is generated by the secondary virtual agent. At 605, the response generated by the secondary virtual agent is received by the virtual agent application service. In some embodiments, the message is received by the primary virtual agent of the virtual agent application service. In various embodiments, the response by the secondary virtual agent can be a synchronous or asynchronous response. For example, some chat conversations require additional processing by the secondary virtual agent and the generated response message is implemented and received as an asynchronous response. In various embodiments, the message is received at the virtual agent application service in the format of the secondary virtual agent.

At 609, the response message is translated to the primary virtual agent format. For example, the response message received at 607 is received in a format of the secondary virtual agent. At 609, the message is translated into the format used by the primary virtual agent. In some embodiments, the translation relies on the configuration performed at steps 305 and/or 307 of FIG. 3. For example, the message payload of the secondary virtual agent format is converted to the payload format of the primary virtual agent format. In some embodiments, in addition to a payload conversation, the contents of the message may be converted, for example, from types compatible with the secondary virtual agent to types compatible with the primary virtual agent and virtual agent application service client. In some embodiments, rich message features are also converted to a feature compatible with the primary virtual agent and virtual agent application service client. For example, a calendaring user interface element utilized by the secondary virtual agent is converted to a corresponding calendaring user interface element of the primary virtual agent and virtual agent application service client. As another example, a file upload user interface element utilized by the secondary virtual agent is converted to a corresponding file upload user interface element of the primary virtual agent and virtual agent application service client. In some embodiments, the translated message includes output parameters configured to be processed by the virtual agent application service and, at step 609, those configured output parameters are processed by the virtual agent application service and/or converted for the virtual agent application service client.

At 611, the translated response message is routed to the client. For example, the message translated at 609 is forwarded by and from the virtual agent application service to the selected user client. In various embodiments, the message is forwarded using the primary virtual agent of the virtual agent application service as one end of the communication connection. In some embodiments, the forwarding of the translated message appears to the user as a chat message as part of an ongoing chat conversation for the conversation topic. The translated message can include rich message features such as rich user interface elements for gathering complex and customized responses from the user. For example, as part of routing the translated message, the user can be presented with a calendaring user interface element for entering a range of dates. As another example, as part of routing the translated message, the user can be presented with a file upload user interface element for sharing a document.

At 613, a determination is made whether the conversation topic is complete. In the event the conversation topic is complete, processing continues to 615. In the event the conversation topic is not complete, processing loops back to 601 where another message is received from the user. In various embodiments, the completion step associated with a conversation topic can be initiated by the user, by the secondary virtual agent, by a timeout, by the virtual agent application service, or by another appropriate trigger.

At 615, the completion of the topic is processed. For example, a completion step for closing a conversation topic is performed. In some embodiments, the completion step includes querying the user for feedback about the conversation. The provided feedback can be used to improve the chat conversation and may query for feedback about the secondary virtual agent and/or the virtual agent application service. In some embodiments, the completion step can include determining whether the user has additional issues to resolve. For example, the user may have an additional topic to address. In the event the user wishes to continue the virtual agent session, the process of FIG. 6 can be repeated once a new topic is identified. In the event the user does not wish to continue with a new topic, the virtual agent session can be closed as part of the completion step.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving a chat message from a user to a primary virtual agent service;
   identifying a conversation topic among a plurality of configured conversation topics including by determining an intent of the user based on the chat message and evaluating the intent with respect to each of the plurality of configured conversation topics;
   based on the identified conversation topic, automatically selecting a secondary virtual agent service to handle the chat message, wherein the secondary virtual agent service is selected from a plurality of candidate secondary virtual agent services that includes at least one virtual agent service provided by a third-party entity external to an entity providing the primary virtual agent service;
   using one or more processors to transform the chat message from a first format of the primary virtual agent service to a second format of the selected secondary virtual agent service; and
   forwarding the chat message in the second format to the selected secondary virtual agent service.

2. The method of claim 1, wherein identifying the conversation topic includes:
   for each of the plurality of configured conversation topics, determining a corresponding confidence score for the chat message; and
   selecting one of the plurality of configured conversation topics with a highest corresponding confidence score among the determined corresponding confidence scores as the identified conversation topic.

3. The method of claim 1, wherein determining the intent of the user includes performing a Natural Language Understanding (NLU) analysis or a keyword analysis on the received chat message.

4. The method of claim 1, wherein forwarding the chat message in the second format to the selected secondary virtual agent service includes transmitting to the selected secondary virtual agent service the determined intent or the identified conversation topic.

5. The method of claim 1, wherein transforming the chat message from the first format of the primary virtual agent service to the second format of the selected secondary virtual agent service includes converting a data type of the primary virtual agent service to a corresponding data type of the selected secondary virtual agent service.

6. The method of claim 1, wherein the chat message received from the user includes a document, a photo, or a video; and wherein the chat message in the second format includes the document, the photo, or the video.

7. The method of claim 1, further comprising:
   receiving a response message from the selected secondary virtual agent service in the second format of the selected secondary virtual agent service;
   transforming the response message from the second format of the selected secondary virtual agent service to the first format of the primary virtual agent service; and
   forwarding the response message of the first format to the user.

8. The method of claim 7, wherein transforming the response message from the second format of the selected secondary virtual agent service to the first format of the primary virtual agent service includes converting a user interface element compatible with the selected secondary virtual agent service to a corresponding user interface element compatible with the primary virtual agent service.

9. The method of claim 8, wherein the user interface element compatible with the selected secondary virtual agent service is a calendaring user interface element configured to receive a date selection.

10. The method of claim 8, wherein the user interface element compatible with the selected secondary virtual agent service is a file upload user interface element configured to receive a file.

11. A system, comprising:
one or more processors; and
a memory coupled to the one or more processors, wherein the memory is configured to provide the one or more processors with instructions which when executed cause the one or more processors to:
receive a chat message from a user to a primary virtual agent service;
identify a conversation topic among a plurality of configured conversation topics including by determining an intent of the user based on the chat message and evaluating the intent with respect to each of the plurality of configured conversation topics;
based on the identified conversation topic, automatically select a secondary virtual agent service to handle the chat message, wherein the secondary virtual agent service is selected from a plurality of candidate secondary virtual agent services that includes at least one virtual agent service provided by a third-party entity external to an entity providing the primary virtual agent service;
transform the chat message from a first format of the primary virtual agent service to a second format of the selected secondary virtual agent service; and
forward the chat message in the second format to the selected secondary virtual agent service.

12. The system of claim 11, wherein causing the one or more processors to forward the chat message in the second format to the selected secondary virtual agent service includes causing the one or more processors to transmit to the selected secondary virtual agent service the determined intent or the identified conversation topic.

13. The system of claim 11, wherein causing the one or more processors to identify the conversation topic includes causing the one or more processors to:
for each of the plurality of configured conversation topics, determine a corresponding confidence score for the chat message; and
select a one of the plurality of configured conversation topics with a highest corresponding confidence score as the identified conversation topic.

14. The system of claim 11, wherein causing the one or more processors to determine the intent of the user includes causing the one or more processors to perform a Natural Language Understanding (NLU) analysis or a keyword analysis on the received chat message.

15. The system of claim 11, wherein causing the one or more processors to transform the chat message from the first format of the primary virtual agent service to the second format of the selected secondary virtual agent service includes causing the one or more processors to convert a data type of the primary virtual agent service to a corresponding data type of the selected secondary virtual agent service.

16. The system of claim 11, wherein the chat message received from the user includes a document, a photo, or a video; and wherein the chat message in the second format includes the document, the photo, or the video.

17. The system of claim 11, wherein the memory is further configured to provide the one or more processors with instructions which when executed cause the one or more processors to:
receive a response message from the selected secondary virtual agent service in the second format of the selected secondary virtual agent service;
transform the response message from the second format of the selected secondary virtual agent service to the first format of the primary virtual agent service; and
forward the response message of the first format to the user.

18. The system of claim 17, wherein causing the one or more processors to transform the response message from the second format of the selected secondary virtual agent service to the first format of the primary virtual agent service includes causing the one or more processors to convert a user interface element compatible with the selected secondary virtual agent service to a corresponding user interface element compatible with the primary virtual agent service.

19. The system of claim 18, wherein the user interface element compatible with the selected secondary virtual agent service is a calendaring user interface element configured to receive a date selection or a file upload user interface element configured to receive a file.

20. A computer program product, the computer program product being embodied in a non-transitory computer readable storage medium and comprising computer instructions for:
receiving a chat message from a user to a primary virtual agent service;
identifying a conversation topic among a plurality of configured conversation topics including by determining an intent of the user based on the chat message and evaluating the intent with respect to each of the plurality of configured conversation topics;
based on the identified conversation topic, automatically selecting a secondary virtual agent service to handle the chat message, wherein the secondary virtual agent service is selected from a plurality of candidate secondary virtual agent services that includes at least one virtual agent service provided by a third-party entity external to an entity providing the primary virtual agent service;
transforming the chat message from a first format of the primary virtual agent service to a second format of the selected secondary virtual agent service; and
forwarding the chat message in the second format to the selected secondary virtual agent service.

\* \* \* \* \*